United States Patent [19]

Nakada et al.

[11] 4,378,720
[45] Apr. 5, 1983

[54] ELECTRONIC MUSICAL INSTRUMENT HAVING MUSICAL PERFORMANCE TRAINING SYSTEM

[75] Inventors: Akira Nakada, Hamamatsu; Eisaku Okamoto, Hamakita; Toshio Sugiura; Kiyoshi Yoshida, both of Hamamatsu, all of Japan

[73] Assignee: Nippon Gakki Seizo Kabushiki Kaisha, Hamamatsu, Japan

[21] Appl. No.: 183,385

[22] Filed: Sep. 2, 1980

[30] Foreign Application Priority Data

Sep. 6, 1979 [JP] Japan .............................. 54-114414

[51] Int. Cl.³ .............................................. G10F 1/00
[52] U.S. Cl. .................... 84/1.03; 84/470 R; 84/478
[58] Field of Search .............. 84/478, 1.03, 470 R, 84/464, DIG. 12

[56] References Cited

U.S. PATENT DOCUMENTS 3,881,390  5/1975  Gullickson ............................ 84/478
4,281,579  8/1981  Bennet, Sr. ........................... 84/478
4,295,406 10/1981  Smith ................................ 84/470 R

*Primary Examiner*—J. V. Truhe
*Assistant Examiner*—Forester W. Isen
*Attorney, Agent, or Firm*—Frishauf, Holtz, Goodman & Woodward

[57] ABSTRACT

An electronic musical instrument comprises a keyboard, tone signal forming circuit to produce musical tone signals corresponding to keys being depressed on the keyboard, a memory to store musical performance data representing pitches and durations of notes and durations of rests according to the progression of a musical performance, a keyboard indicator to visually indicate which keys are to be depressed on the keyboard in accordance with the performance data read out of the memory so that the pupil or trainee may effect a musical performance on the keyboard by following the key indications, and an automatic musical performance device to effect an automatic musical performance in synchronism with the musical performance to be effected on the keyboard. A control circuit for the memory is arranged such that the key indication for each note in the progression of music is effected in the period of the duration of the immediately preceding note or rest. In other word, when the trainee depresses each melody note, the indicator points the key for the succeeding note.

8 Claims, 9 Drawing Figures

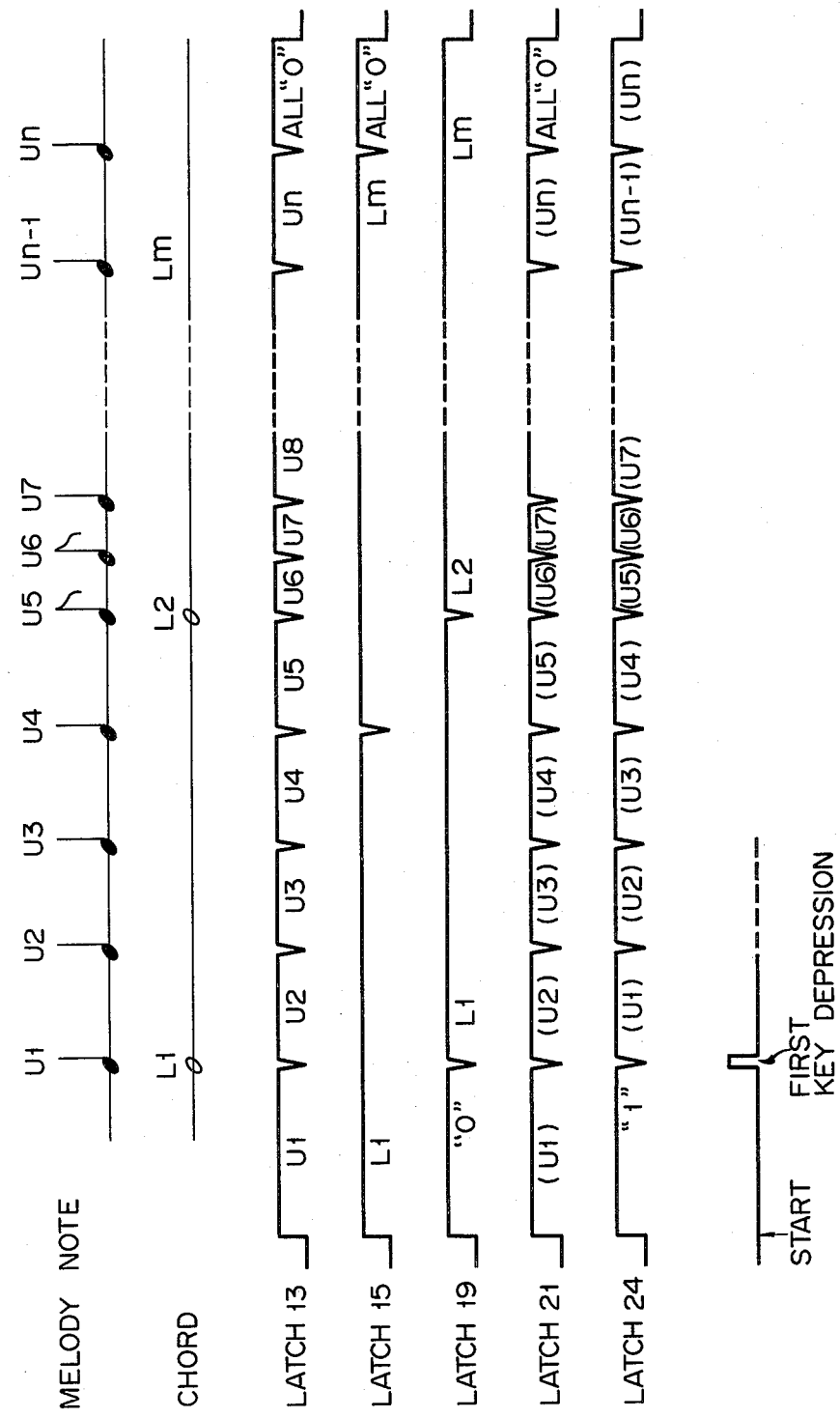

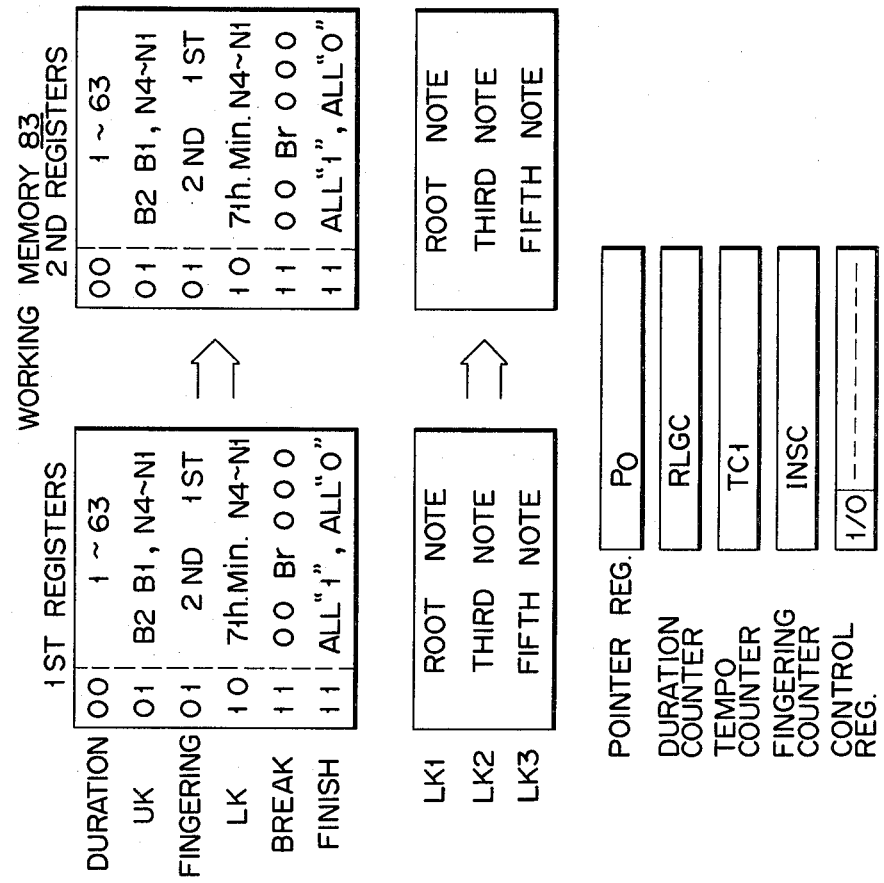

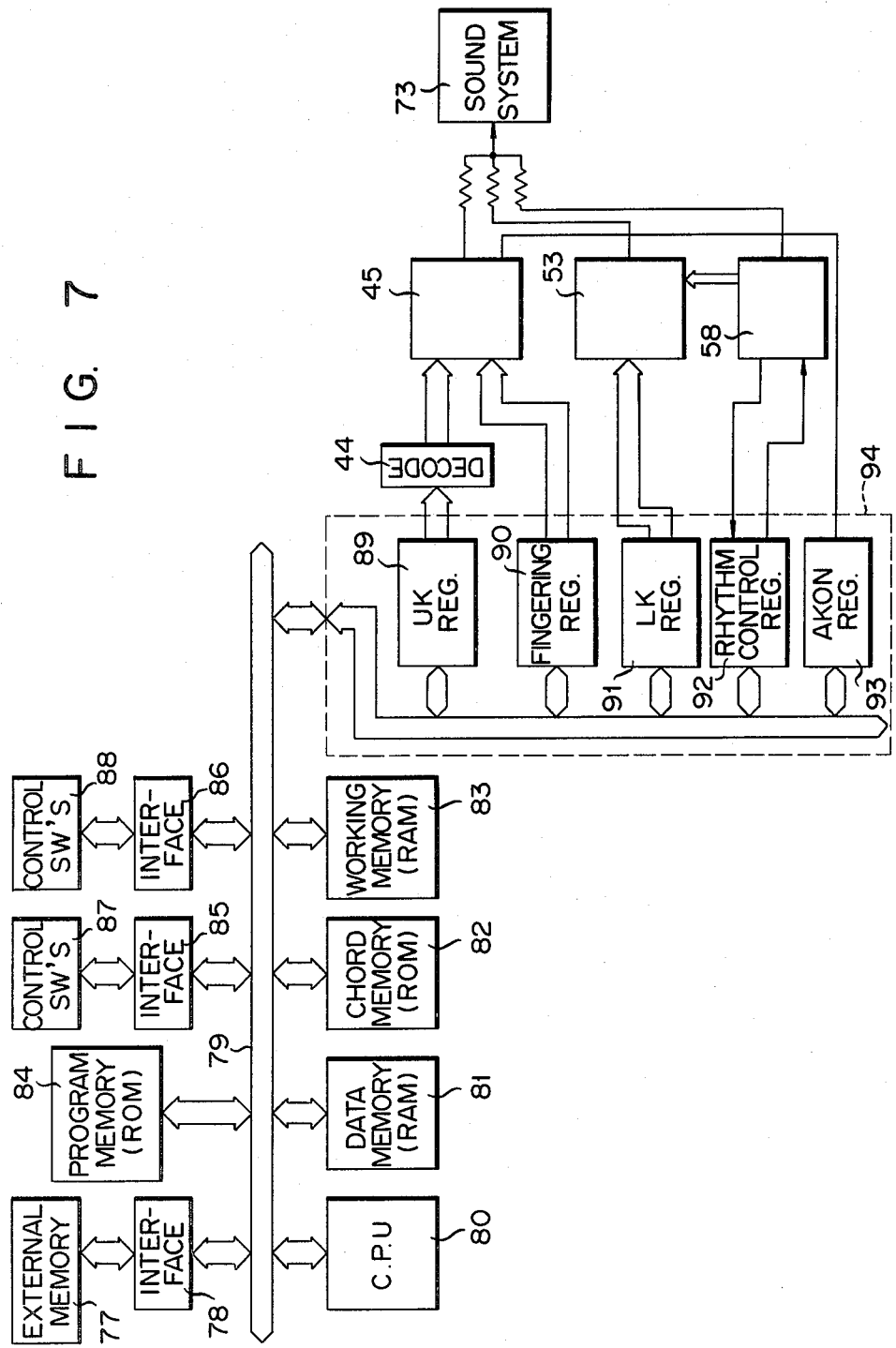

ELECTRONIC MUSICAL INSTRUMENT HAVING MUSICAL PERFORMANCE TRAINING SYSTEM

BACKGROUND OF THE INVENTION

This invention relates to an electronic musical instrument, and, more particularly to an electronic musical instrument with which a pupil or trainee may effectively practice.

In order for a pupil or trainee to readily practice a keyboard instrument, a key indication system is proposed which visually instructs the pupil or trainee as to which keys are to be actuated on a keyboard. For example, according to the system disclosed in U.S. Pat. No. 3,353,435, a two-track magnetic tape is used, one-track being recorded with a teacher's vocal instruction or sound of the organ, and the other track being recorded with key designating signals to designate keys to be actuated on the keyboard. When the trainee plays the instrument, indication lamps for the respective keys are selectively lit in accordance with the key designation signals reproduced from the magnetic tape, so that the trainee may operate the keys as indicated to play a designated musical piece. Due to the audible instruction or sounds reproduced from the magnetic tape, the trainee can also be informed through his sense of hearing as to which keys are to be actuated or listen to the sounds corresponding to keys to be actuated.

In U.S. Pat. No. 4,037,511, a key designating device is disclosed which is comprised of an apertured record sheet and an optical readout device.

With such a self-training system for keyboard instruments, it is difficult for the trainee to play the instrument with musical sensation because he is merely required to operate the keys as indicated. To make an effective performance of the keyboard instrument with musical sensation it is desired that the trainee can play a melody on the keyboard, while following key indications to the accompaniment of an automatic performance of chords and/or rhythms. It is relatively difficult, however, for the pupil or trainee to promptly actuate the keys as indicated on the keyboard in synchronism with the automatic performance of chords and/or rhythms.

An object of this invention is to provide an electronic musical instrument which visually indicates a key before the time at which the key is to be depressed on a keyboard, so that a pupil or trainee may relatively easily play a musical piece on the keyboard, while following key indications, to the accompaniment of an automatic performance.

SUMMARY OF THE INVENTION

According to this invention, there is provided an electronic musical instrument comprising keyboard means having keys; tone forming circuit means coupled to the keyboard means for producing a musical tone signal corresponding to the note of a key being depressed; memory means for storing performance data of a music to be played in the form of note pitch data and duration data of each note; keyboard indicator means coupled to the memory means and responsive to application of note pitch data of each note read out of the memory means for visually indicating a key to be depressed on the keyboard means; and control means for reading at least the note pitch data of said performance data out of the memory means and to sequentially apply the note pitch data of each note to the keyboard indicator means to cause the keyboard indicator means to visually indicate a respective key determined by the note pitch data of each note at a timing which precedes by a predetermined time length a correct timing at which the indicated key is to be depressed.

Namely, according to this invention, the key indication for each note may be effected prior to the timing at which the note is to be sounded for the period of the duration of the immediately preceding note, so that a pupil or trainee may readily operate keys as indicated by the keyboard display means in accordance with the performance data read out of the memory means.

BRIEF DESCRIPTION OF THE DRAWINGS

FIG. 5 is a time chart for explaining the operation of the electronic musical instrument;

FIG. 6 shows another memory map of the memory;

FIG. 7 is a schematic block diagram of a computerized electronic musical instrument;

FIG. 8 shows memory contents of the working memory of FIG. 7; and

DETAILED DESCRIPTION

This invention will be described, by way of example, in connection with an electronic organ including an upper keyboard adapted mainly for melody performance, a lower keyboard adapted mainly for chord performance and an automatic rhythm performance device.

Figure 1:
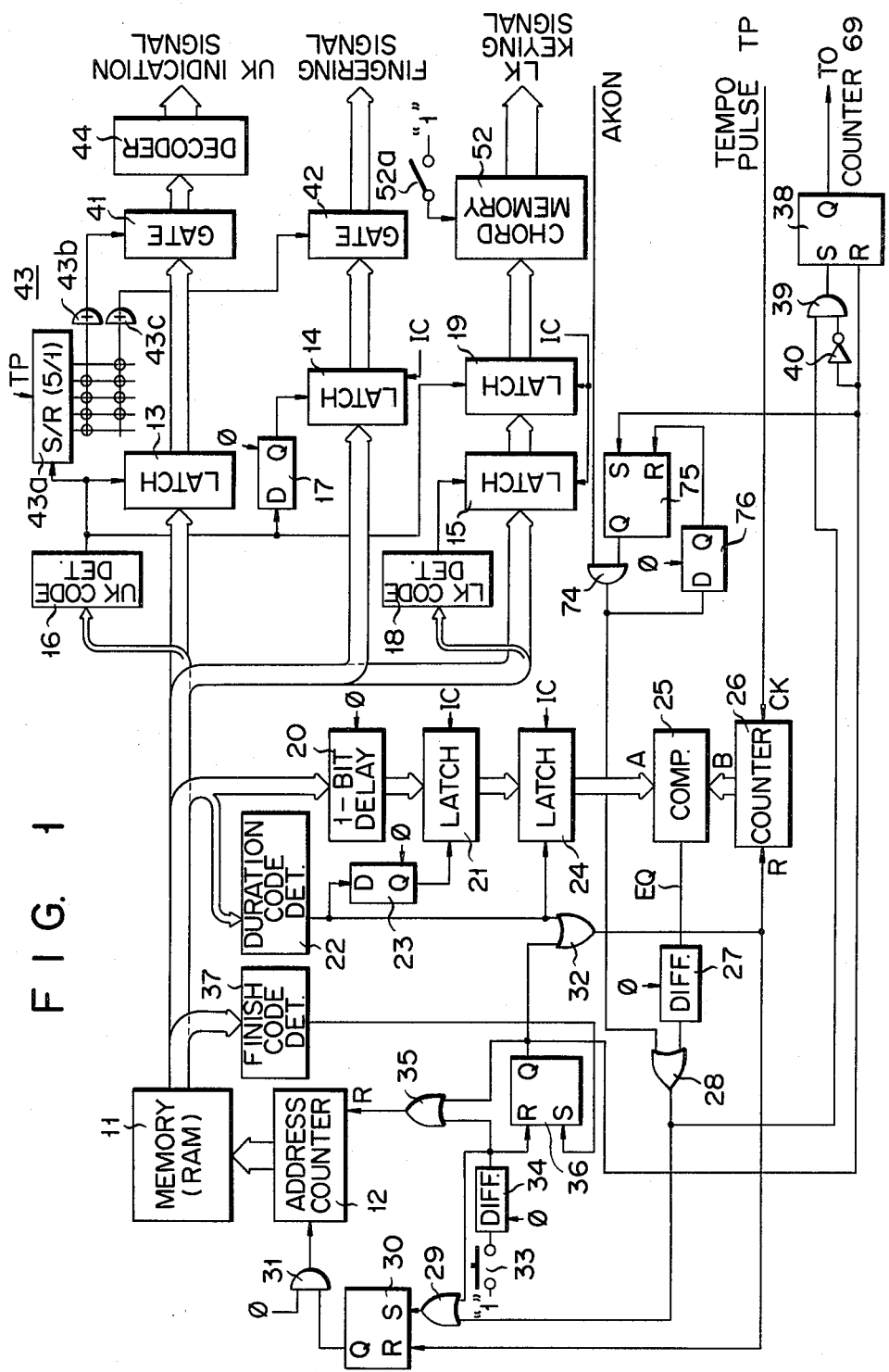
FIG. 1 shows, in block form, a part of an electronic musical instrument embodying this invention.

In FIG. 1, reference numeral 11 designates a memory formed of, for example, a random access memory (RAM) which stores performance data of a musical piece to be played on the organ. The performance data comprises of melody data and accompaniment or chord data and they are grouped into a plurality of sets of data each corresponding to each change in key depression on at least one of the upper keyboard and lower keyboard. In the case where both the melody tone and the chord tone are changed, i.e. the depressions of both the upper keyboard key and the lower keyboard key are changed, the set of data includes melody note pitch data adapted to visually instruct a pupil or trainee as to which key is to be depressed on the upper keyboard, fingering data adapted to visually instruct the pupil or trainee as to which finger is to be used to operate the key as indicated, chord data representing the chord to be played and duration data representing the length of time until the next change occurs. In the case where only the melody tone is changed, the set data includes the data only relating to the melody. In the case where only the chord is changed, the set data includes only the data relating to the chords. The respective data have a word length of eight bits and are stored in memory locations of the respective addresses. The addresses of memory locations are designated by an address counter 12 for counting a system clock pulse $\phi$ (e.g. 1 MHz) so that the respective data are sequentially read out of the memory 11. As described later, the data readout from the memory 11 is suspended each time the readout of one set of data corresponding to a single unchanged period is finished. The data readout is resumed after the elapse of a time represented by the note duration data which has been lastly read out in the immediately preceding set of data.

Figure 4:
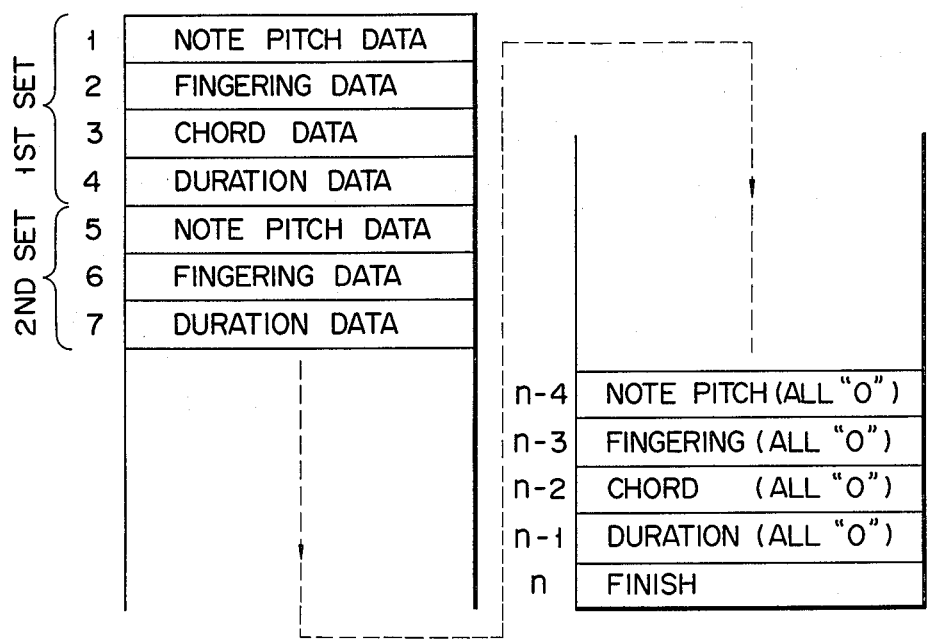
FIG. 4 shows a memory map of the memory 11 of FIG 1.

FIG. 4 shows, by way of example, a memory map representing an arrangement of the performance data stored in the respective memory locations. In the memory locations having addresses 1 through 4 there are respectively stored the first melody note pitch data, the first fingering data, the first chord data and the first melody note duration data. In the memory locations having addresses 5, 6, 7 there are respectively stored the second melody note pitch data, the second fingering data, the second melody note duration data. The data stored in the memory locations having addresses 1 through 4 constitute the first set of data, and the data stored in the memory locations having addresses 5 through 7 constitute the second set of data. Each note duration data is used to define the boundary between the sets of data. The absence of chord data in the second set of data means that the chord represented by the chord data in the first set of data should be continuously played together with the second melody note. In the last memory location there is stored a FINISH code representing the end of the music performance.

Data formats used in this embodiment will be described. Each data item includes a two-bit identifying code. The melody note pitch data comprises a UK identifying code of, for example, "10" designating the upper keyboard adapted mainly for melody performance, and six-bit note pitch data (key designating data). Further, the note pitch data comprises of four-bit note name data and two-bit octave data representing the octave to which the note belongs. The chord data comprises an LK code of "01" designating the lower keyboard adapted mainly for chord performance and six-bit data representing the chord to be played. The six-bit data comprises two-bit data representing one of chord types such as a major triad, a minor triad, a dominant seventh and a minor seventh chords and four-bit data representing the root note of a chord. The root note and chord type define the chord to be played. The note duration data comprises the duration identifying code "00" and six-bit duration data. The fingering data comprises the UK identifying code of "10" like the melody note pitch data and five-bit data representing one of five fingers of a hand. The five places of the five-bit data individually correspond to five fingers, respectively. Accordingly, when "1" is positioned only at the first place of the five-bit data, a predetermined finger, e.g. thumb is specified. It is noted that one bit of the fingering data is not used. The FINISH data has a finish identifying code of "11".

The last set of data includs, as shown in FIG. 4, melody note pitch data, fingering data, chord data and duration data in each of which six bits other than the two-bit identifying code are all "0".

Turning back to FIG. 1, the six-bit data read out of the memory 11 is commonly applied to a latch circuit 13 for storing melody note pitch data, a latch circuit 14 for storing fingering data, a latch circuit 15 for storing chord data and a one-bit time delay circuit 20 for providing a time delay corresponding to the one cycle period of the system clock pulse $\phi$. The two-bit data read out of the memory 11 constituting an identifying code is commonly applied to a UK code detector 16, an LK code detector 18, a duration code detector 22 and a finish code detector 37.

Upon detection of the UK code "10", the detector 16 produces a latch enable signal by which the latch circuit 13 is enabled to latch the note pitch data read out of the memory 11. As will be evident from the memory map shown in FIG. 4, each fingering data is read out of the memory 11 immediately subsequent to corresponding note pitch data with a time delay corresponding to the one cycle period of the system clock $\phi$ during which the address counter 12 is incremented by one. Since the latch enable signal produced by the UK code detector 16 is applied to the latch circuit 14 through a type-D flip-flop circuit 17 driven by the system clock $\phi$, the fingering data read out of the memory 11 can be latched by the latch circuit 14.

When the LK code detector 18 detects the LK code "01", the chord data read out of the memory 11 is latched by the latch circuit 15 followed by a latch circuit 19 which is enabled by the UK code detector 16. Namely, the chord data latched by the latch circuit 15 is shifted to the latch circuit 19 when the next set of data is read out of the memory 11, in other words, when the note pitch data of the next set data is latched by the latch circuit 13.

Upon detection of the note duration code "00", the detector 22 produces a latch enable signal which is applied through a type-D flip-flop circuit 23 driven by the system clock $\phi$ to a latch circuit 21 connected to the one-bit time delay circuit 20 driven by the system clock $\phi$. Accordingly, the latch circuit 21 is enabled to latch the note duration data read out of the memory 11. The latch circuit 21 is followed by a latch circuit 24 which is directly enabled by the detector 22 so that the note duration data which has been latched by the latch circuit 21 is latched by the latch circuit 24 when the next set data is read out of the memory 11.

The note duration data latched by the latch circuit 24 is coupled to a comparator 25 as a comparison signal A. To the comparator 25 is coupled, as the other comparison signal B, a count output signal of a note duration counter 26 which counts a tempo pulse TP produced by a tempo oscillator of the automatic rhythm performance device and having a period corresponding to the duration of a one-hundred and twenty-eighth note. The counter 26 is reset when the detector 22 detects the note duration identifying code of "00".

The comparator 25 produces an equal signal EQ when a coincidence occurs between the comparison signals A and B. The signal EQ is differentiated by a differentiator 27 driven by the system clock $\phi$. A differentiated output signal of the differentiator 27 is applied through OR gates 28 and 29 to the set input of a readout-control flip-flop circuit 30 to cause the set output Q thereof to go high. As a result, an AND gate 31 coupled the output Q of flip-flop circuit 30 is enabled to apply the system clock $\phi$ to the address counter 12 as an address advancing signal.

The flip-flop circuit 30 has its reset input connected to receive a detection signal of the note duration code detector 22 through an OR gate 32 so that the flip-flop circuit 30 is reset to disable the AND gate 31 each time the note duration data read out of the memory 11 is detected by the detector 22. Namely, the address counter 12 has its count advanced in increments of one during the readout of one set data as described above. The one set data is read out of the memory 11 within a very short time due to the high frequency system clock φ. As will be evident from the foregoing, when the last data representing a melody note duration in each set of data is read out, the data readout of the memory 11 is suspended. The data readout is resumed when a time corresponding to the note duration data in the immediately preceding set of data which has been latched by the latch circuit 24 elapses, in other words, when the equal signal EQ is produced by the comparator 25.

A start switch 33 connected to a logical 1 level voltage source is coupled through a differentiator 34 driven by the system clock φ to the OR gate 29 coupled to the set input of flip-flop circuit 30 and an OR gate 35 coupled to the reset input of address counter 12. Accordingly, when the start switch 33 is rendered ON the address counter 12 is reset and the flip-flop circuit 30 is set with the result that the address counter 12 is enabled to count the system clock φ from the initial value. Namely, when the start switch 33 is rendered ON, the data readout from the memory 11 starts.

The differentiator 34 is also coupled to the reset input of a flip-flop circuit 36 whose output Q is coupled to the reset input of the address counter 12 through the OR gate 35 and to the reset inputs of the duration counter 26 and the flip-flop circuit 30 through the OR gate 32. The set input of flip-flop circuit 36 is coupled to the finish code detector 37. The output Q of flip-flop circuit 36 is also coupled to the reset input of an auto-rhythm control flip-flop circuit 38 having its output Q coupled to the automatic rhythm performance device as described later which is caused to operate when the flip-flop circuit 38 is set. The set input of flip-flop circuit 38 is coupled to the output of an AND gate 39 having an input coupled to the output of OR gate 28 and the other input coupled to the output of an inverter 40 whose input is coupled to the reset input of flip-flop circuit 38.

Namely, when the detector 37 detects the finish code, the flip-flop circuit 36 is set so that the address counter 12, the note duration counter 26 and the auto-rhythm control flip-flop circuit 38 are all reset, stopping the automatic operation of the electronic organ.

The output data of the latch circuits 13 and 14 are respectively applied to gate circuits 41 and 42 which are enabled by gating signals produced by a gating signal generating circuit 43. The circuit 43 is comprised of a five-stage shift register 43a connected to receive, as an input signal thereof, an output signal that the UK code detector 16 produces when detecting the UK code, and, as a shift pulse, the tempo pulse TP; an OR gate 43b having inputs connected to outputs of the first to fourth stages of the register 43a to produce a gating signal for enabling the gate circuit 41; and an OR gate 43c having inputs connected to outputs of the second to fifth stages of the register 43a to produce a gating signal for enabling the gate circuit 42. Evidently, the gate circuits 41 and 42 are each enabled during a time period four times the one cycle period of the tempo pulse TP corresponding to the one hundred and twenty-eighth note, which is considerably short in comparison with the shortest duration of notes usually used in music. Further, it will be noted that the gate 42 is enabled one cycle tempo pulse TP period behind the gate 41. The purpose is to disable, when the UK code detector 16 detects the UK code in each set of data, the gate 42 from gating the fingering data of the immediately preceding set of data which has been latched by the latch circuit 14, and enable the gate circuit 42 to gate the fingering data which is latched by the latch circuit 14 immediately after the melody note data was latched by the latch circuit 13.

The output data of the gate circuit 41 is coupled to a decoder 44 having the same number of outputs as keys of the upper keyboard. The decoder 44 decodes the note pitch data applied thereto to cause the corresponding one of the individual outputs to go high. This high level output signal is applied as a key indication signal to a UK tone forming circuit section as described later to visually indicate as to which key is to be depressed according to the note pitch data stored in the memory. The fingering data gated by the gate circuit 42 is also applied to the UK tone forming circuit section to visually instruct the pupil or trainee as to which finger is to be used.

The output chord data of the latch circuit 19 is applied, as an address signal, to a code memory (ROM) 52 such as a matrix circuit having the same number of outputs as twelve notes of an octave. The code memory 52 is responsive to the chord data to cause three outputs thereof corresponding to the root, third and fifth notes of the chord designated to go high. For example, when C major triad is designated, the outputs corresponding to the notes C (root note), E (third note) and G (fifth note) go high. The high level output signals of the chord memory 52 are coupled as LK keying signals to an LK musical tone forming circuit section described later. A switch 52a connected to a logical 1 level voltage source is connected to the code memory 52. The switch 52a is provided, when closed, to disable the code memory 52 from coupling the LK keying signals to the LK tone forming circuit section.

Figure 2:
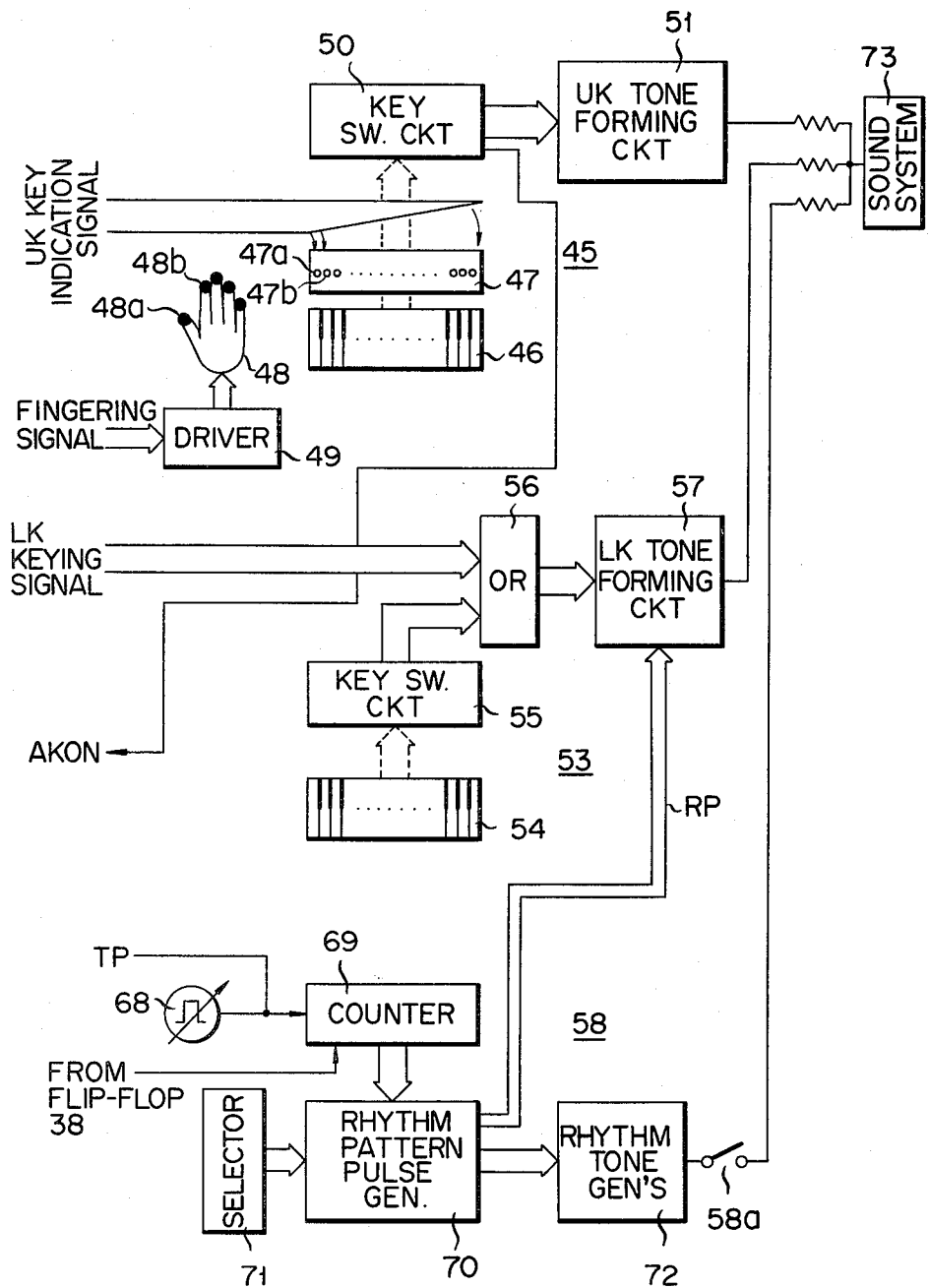
FIG. 2 shows, in block form, the other part of the electronic musical instrument.

FIG. 2 shows an arrangement of musical tone forming sections including the melody (UK) tone forming section 45, the chord (LK) tone forming section 53 and the automatic rhythm performance device 58. The tone forming section 45 is provided with an upper keyboard 46 and a UK key indication circuit 47 associated with the upper keyboard 46. The UK key indication circuit 47 is provided with 48 visual indicators 47a, 47b, ... such as lamps or light-emitting diodes which may be disposed on the respective keys of the upper keyboard 46 and connected to receive a UK key indication signal from the decoder 44 so that a corresponding one of the visual indicators is selectively lit to visually instruct the pupil or trainee the key to be depressed on the upper keyboard 46. There is further provided a fingering indicator 48 of hand shape which has five visual indicators 48a, 48b, ... respectively disposed at the tips of the five finger marks and a driver circuit 49 responsive to a fingering indication signal from the gate circuit 42 to selectively light a corresponding one of five visual indicators, thereby visually instructing the pupil or trainee as to which finger is to be used to actuate the key indicated by the key display circuit 47. A key switch circuit 50 is coupled (as indicated by dotted line arrow) to the upper keyboard 46 and produces a keying signal which is applied to a tone forming circuit 51 when a key is operated on the upper keyboard 46. The UK tone forming circuit 51 forms, in accordance with the keying signal applied thereto from the key switch circuit 50, a corresponding tone signal which is in turn applied to a sound system 73 incorporating a loudspeaker so that a melody tone is sounded. It is to be noted that, in the UK tone forming section, a period of time during which the visual indicators of the UK key indication circuit 47 and fingering indicator 49 are lit is considerably short compared to the duration of a melody tone sounded, or a period of time during which a key is depressed on the upper keyboard 46 to form the melody tone because the gate circuits 41 and 42 are enabled during a very short time as described above.

The LK tone forming circuit section 53 includes a lower keyboard 54 and a key switch circuit 55 coupled to the lower keyboard 54 to produce LK keying signals when keys are actuated on the keyboard 54. The LK keying signals are applied to a chord/bass tone forming circuit 57 from the decoder 52 or the key switch circuit 55 through an OR circuit 56 so that chord/bass tone signals corresponding to the keying signals are produced which are delivered to the sound system 73 to sound the chord/bass tones.

Figure 3:
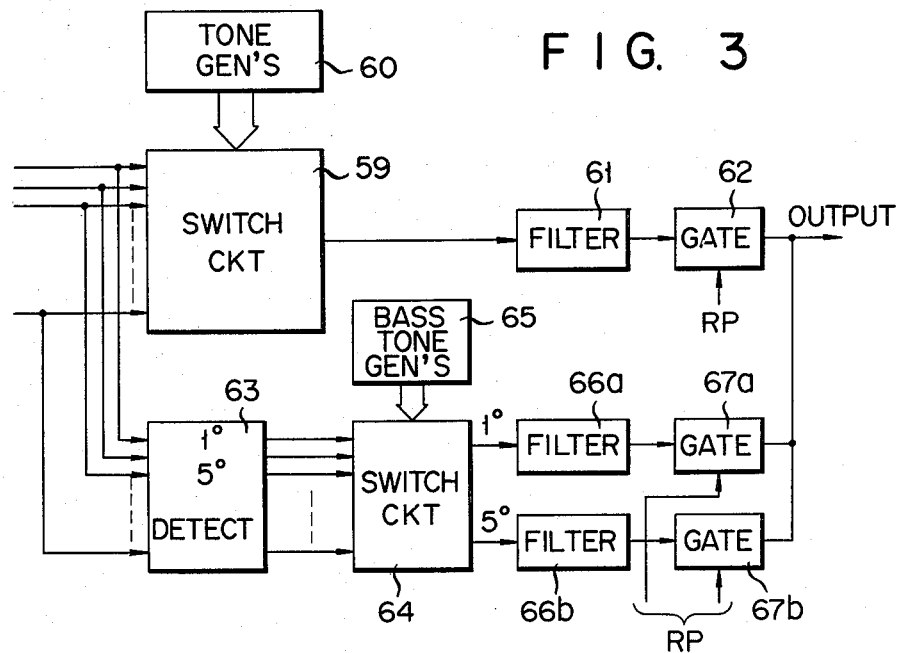
FIG. 3 is a block diagram of the tone forming circuit 57 of FIG. 2.

FIG. 3 shows an arrangement of the chord/bass tone forming circuit 53. The twelve outputs of the OR circuit 56 are coupled to a switch circuit 59 to which twelve tone generators 60 are coupled and which is followed by a tone coloring filter 61 and a gate 62. When the decoder 52 is enabled, or when three keys are simultaneously depressed on the lower keyboard 54, three outputs of the OR circuit 56 go high. This causes the switch circuit 59 to couple three tone generators corresponding to the designated chord to the tone coloring filter 61. For example, when the chord "C major" is designated by the chord data read out of the memory 11 tone generators corresponding to the notes C, E and G are coupled to the tone coloring filter 61.

The outputs of the OR circuit 56 are also coupled to a detector 63 which detects the root note and fifth note of a chord being played. The outputs of detector 63 are coupled to a switch circuit 64 to which are coupled bass tone generators 65 having a compass of pedal keyboard. For example, when the chord "C major" is being played, the outputs of detector 63 corresponding to the note C (root note) and the note G (fifth note) are caused to go high so that bass tone signals corresponding to the notes C and G are coupled to the tone coloring filters 66a and 66b, respectively, which are in turn delivered to the sound system 73 through gates 67a and 67b, respectively.

The gates 62, 67a and 67b are enabled and disabled by rhythm pulse signals RP from the automatic rhythm performing device 58 to provide rhythmic chord and bass performances. The gates 67a and 67b are alternately enabled and disabled by the rhythm pulse signals.

The automatic rhythm performance device 58 is provided, as shown in FIG. 2, with a tempo oscillator 68 of frequency-variable type. The tempo clock TP of the oscillator 68 is applied to the above-mentioned duration counter 26 and a counter 69 having a plurality of binary stages which is enabled to count the tempo clock TP by the rhythm start signal produced by the flip-flop circuit 38 when it is set. The binary outputs of the counter 69 are coupled to a rhythm pattern pulse generator 70 which produces a plurality of rhythm pattern signals and the rhythm pulses to drive the gates 62, 67a and 67b. Outputs of the rhythm pattern pulse generator 70 are coupled to respective rhythm tone generators 72. A rhythm selector 71 is provided for selecting one or more desired rhythm tone generators and selecting rhythm pattern signals to drive the selected rhythm tone generators. The rhythm tone signals thus produced are mixed together and then delivered to the sound system 73 through a rhythm tone control switch 58a to sound rhythm tones.

The key switch circuit 50 of the UK tone forming section 45 is arranged to produce a key-on signal AKON when any one of keys is depressed on the upper keyboard 46. The key-on signal AKON is coupled to an input of an AND gate 74 (FIG. 1) having its output coupled to the OR gate 28. To the other input of the AND gate 74 is coupled the output Q of a flip-flop circuit 75 having its set input coupled to the output Q of the flip-flop circuit 36. The output of AND gate 74 is coupled through a type-D flip-flop circuit 76 driven by the system clock φ to the reset input of the flip-flop circuit 75.

When the electronic organ is inoperative, the flip-flop circuit 75 having its set input connected to the output Q of the start/stop control flip-flop circuit 36 is set, enabling the AND gate 74 to permit passage of a key-on signal AKON produced by the key switch circuit 50 coupled to the upper keyboard 46. The flip-flop circuit 75 is reset by the first key-on signal which is produced upon the first depression of a key on the upper keyboard 46 and permitted to pass through the AND gate 74. Since the output signal of the AND gate 74 is coupled to the reset input of the flip-flop circuit 75 through the delay circuit 76, the AND gate 74 is disabled after the passage of the first key-on signal. Namely, AND gate 74 is permitted to pass only the first key-on signal AKON therethrough. After the electronic organ is operated by depression of the start switch 33, the first key-on signal AKON permitted to pass through the AND gate 74 sets the flip-flop circuit 30 to cause the address counter 12 to count the system clock φ and sets the auto-rhythm control flip-flop circuit 38 to cause the automatic rhythm performance device 58 to operate.

The operation of the electronic organ will be described hereinafter with reference to FIG. 5. To operate the electronic organ, first, an initial clear signal IC is applied to each of the latch circuits 13, 14, 15, 19, 21 and 24 so that the latch circuits 13, 14, 15 and 19 are all cleared to the "0" state, while the latch circuits 21 and 24 are all set to the "1" state. In this condition, the flip-flop circuits 36 and 75 are set, while the flip-flop circuits 30, 38 and the address counter 12 are reset.

Suppose that the memory 11 stores sequentially melody note data U1, U2, U3, ... Un and chord data L1, L2, ... Lm as shown in FIG. 5. When the start switch 33 is switched ON, the address counter 12 counts the system clock φ from the initial value with the result that the first set of data is read out of the memory 11 which includes the first melody note pitch data, the first fingering data, the first chord data and the first melody note duration data. As shown in FIG. 5, the first melody note pitch data U1, the first chord data L1 and the first melody note duration data (U1) are latched by the latch circuits 13, 15 and 21, respectively. The first fingering data is latched by the latch circuit 14. At this time, the output of the latch circuit 19 represents the all "0" state, while the output of the latch circuit 24 represents the all "1" state. Upon detection of the note duration data by the detector 22 the data readout from the memory 11 is stopped. The UK indication circuit 47 and the fingering indicator 48 are responsive to the note pitch data and fingering data latched by the latch circuits 13 and 14 to visually instruct the pupil or trainee during the very short time period as to which key is to be depressed on the upper keyboard 46 and which finger is to be used to depress the key instructed. At this time, since the latch circuit 19 latches no chord data, the LK tone forming circuit 53 produces no LK musical tone signals. Since the flip-flop circuit 38 remains reset, the automatic rhythm performance device 58 does not operate. The latch circuit 24 stores the maximum count of all "1". Accordingly, even if the duration counter 26 counts the tempo pulse TP the comparator 25 produces no equal signal EQ during a relatively long time period.

Upon actuation of the first key as indicated by the UK indication circuit 47, a melody tone corresponding to the note of the key being depressed is sounded, and the first key-on signal AKON is produced by the key switch circuit 50 coupled to the upper keyboard 46. The first key-on signal AKON sets the flip-flop circuit 30 to cause the address counter 12 to count the system clock $\phi$. As a result, the second set of data including the second melody note pitch data, the second fingering data and the second melody note duration data is read out of the memory 11. Simultaneously, the first key-on signal AKON sets the auto-rhythm control flip-flop circuit 38 to cause the automatic rhythm performance device 58 to produce rhythm tones.

The second melody note pitch data U2 and the second fingering data are latched by the latch circuits 13 and 14, respectively, so that a key and a finger for the second melody note are visually instructed to the trainee. The second melody note duration data is latched by the latch circuit 21. In response to detection of the UK code of the second set data, the latch circuit 19 latches the first chord data L1 which has been latched by the latch circuit 15 with the result that the LK tone forming section 53 produces LK musical tone signals. The latch circuits 15 and 19 hold the first chord data L1 until a change in chord data occurs. In response to detection of the second duration code by the detector 22, the latch circuit 24 latches the first duration data (U1) which has been latched by the latch circuit 21.

Namely, as will be evident from FIG. 5, upon actuation of a first indicated key on the upper keyboard 46, a melody tone corresponding to the first melody note pitch data is sounded, a key to be actuated next is visually indicated by the second melody note pitch data latched by the latch circuit 13, a chord corresponding to the first chord data latched by the latch circuit 19 is sounded, and an automatic rhythm performance device is operated to sound rhythm tones.

Since the latch circuit 24 latches the first melody note duration data, the data readout from the memory 11 is suspended during a period of time represented by the first melody note duration data. Upon elapse of the period of time corresponding to the first melody note duration, the comparator 25 produces an equal signal EQ, causing the third set of data to be read out of the memory 11. Thereafter, the above-mentioned operations are repeated until the finish code representing the end of music being played is read out of the memory 11.

According to the electronic musical instrument of this invention, as described above, the pupil or trainee is enabled to play a melody on the upper keyboard, while following key indications, together with an automatic chord/bass performance and/or automatic rhythm performance. Moreover, the key indication for a melody note is effected almost momentarily in the duration period of the immediately preceding melody note (or rest) i.e. prior to the timing at which the melody note is to be sounded in synchronism with an automatic accompaniment tone. Due to the prior and momentary key indication, the trainee can perform a key operation readily without resorting to the key indication too much.

With the above-mentioned embodiment, in order to perform the prior key indication, each set of data stored in the memory is arranged to have note pitch data, note duration data and fingering data for a melody note, or, in addition thereto, chord data, and the two latch circuits are used for latching each of the chord data and note duration data.

Though dependent on the arrangement of performance data stored in the memory, a single latch circuit will suffice for each of the chord data and duration data. To this end, it is only required that, as shown in FIG. 6, the first set of data have the first melody note pitch data, the first fingering data and a boundary code having the duration identifying code but no duration data, and the second set of data have the second melody note pitch data, the second fingering data, the first chord data, and the first note duration data. Namely, the performance data is arranged such that the note duration data of a melody note and the chord data corresponding to the melody note are included in a set of data which immediately succeeds a set of data in which the note pitch data and the fingering data of the melody note are included. With such an arrangement, one of the latch circuits for each of the chord data and duration data may be omitted to perform the same operation as the above-mentioned embodiment.

The above-mentioned apparatus may be realized by a computer circuit. As shown in FIG. 7, the performance data from an external memory 77 such as a magnetic tape are coupled through an interface 78 to a common bus 79 to which a central processing unit (CPU) 80, a data memory 81, a chord data memory 82, a working memory 83, a program memory 84 are coupled. To the common bus 79 control switch groups 87 and 88 are coupled through interfaces 85 and 86, respectively. Further, to the common bus 79 is coupled in interface 94 including an UK data (melody note pitch data) register 89, a fingering data register 90, an LK data (chord data) register 91, a rhythm control register 92, and an AKON register 93. The UK data register 89 is coupled to the UK tone forming section 45 through the decoder 44 and the fingering data register 90 is coupled to the tone forming section 53. The LK data register 91 is coupled to the LK tone forming section 53. The rhythm control register 92 is coupled to the automatic rhythm performance device 58. The AKON register 93 is coupled to the UK tone forming section 45 to receive an AKON signal therefrom.

The control switch group 87 is adapted to control the transmission of the performance data stored in the external memory 77 to the data memory 81, while the control switch group 88 is adapted to effect the start/-stop control of the musical instrument, readout of the performance data from the data memory 81 and transmission of them to the interface 94.

FIG. 8 shows the contents of the working memory 83 which is provided with first and second register groups each adapted to store the note duration data, melody note pitch data, chord data, break instruction data (adapted to prevent adjacent two notes of the same pitch from sounding continuously), chord root note data, chord third note data, chord fifth note data, and the FINISH code representing the end of a music performance. By execution of programs, the data stored in the second registers are transferred to the registers of the interface 94, the data in the first registers to the second registers, and the data read out of the data memory 81 to the first registers. Further, a pointer register P0, a duration counter RLGC, a tempo counter TC1, a fingering counter INSC, and a control register are provided. The control register stores at the first bit position thereof data "1" or "0" specifying the operation mode of the musical instrument. For example, when the data "1" is present at the first bit position, the prior key indication mode as in the previous embodiment is specified.

Figure 9:
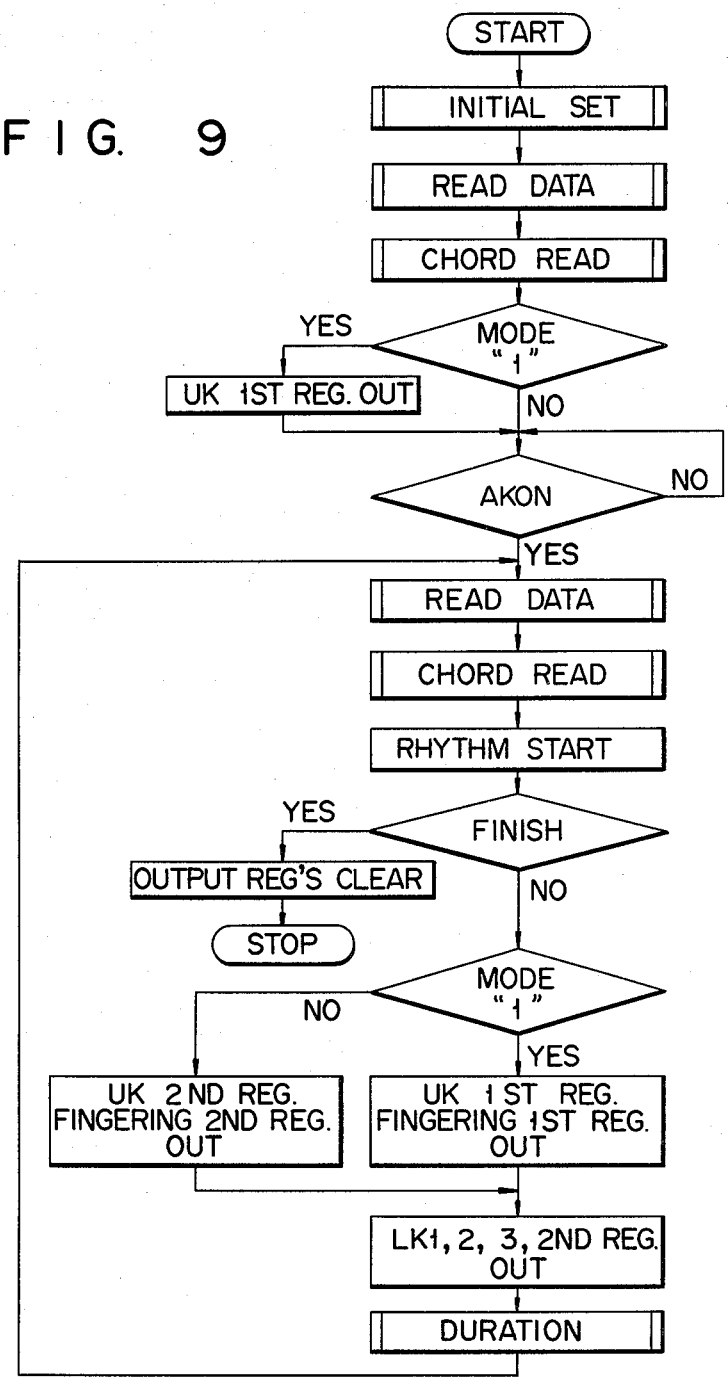
FIG. 9 is a flow chart explaining operations of the instrument of FIG. 7.

FIG. 9 is a flow chart for explaining the operation of the above-mentioned apparatus. When a start instruction is first given, the apparatus is initially set so that the first and second registers of the working memory 83 are cleared and the pointer register P0 to set to the start address of the data memory 81. Simultaneously, the duration counter, tempo counter and fingering counter are cleared and data provided by the control switch group 88 are loaded into the control register. A subroutine "READ DATA" is executed so as to transfer the contents of the first registers to the second registers, and load the first set of data read out of the data memory 81 into the first registers of the working memory 83. Next, a subroutine "CHORD READ" is executed so that chord root note data LK1, third note data LK2 and fifth note data LK3 are read out of the chord memory 82 by the LK data stored in the register portion and stored in corresponding register portions of the working memory 83.

In this condition, the mode control is effected by the control register of the working memory 83. When "1" exists at the first bit position of the control register, the prior key indication mode is effected. In this mode, the UK data is read out of the first registers of the working memory 83 to effect a key indication in the UK tone forming section 45.

In response to the generation of the signal AKON in the UK tone forming section 45, the CPU 80 executes a subroutine "READ DATA" so that the contents of the first registers are shifted to the second registers. Each time the contents are shifted from the first registers to the second registers the pointer register P0 is incremented by one by the CPU 80 so that the next set of data is read out of the data memory 81 and loaded into the first registers. Where no LK data is present in the next set of data, the previous LK data is held. When the break data is absent in the next set of data, the register for storing the break data is cleared.

At this stage, a start instruction is given to the rhythm control register 92 to operate the automatic rhythm performance device 58. Thereafter, as long as the FINISH code is not present, a mode judgment is made with the control register. If the judgment is "YES", namely where the prior key indication is effected, the UK data and fingering data are delivered from the first registers to the interface 94. On the other hand, if the judgment is "NO", the UK data and fingering data are delivered from the second registers of the working memory 83 to the interface 94. The tempo counter TC is set to a count corresponding to the note duration data and counted down by the tempo pulse TP from the automatic rhythm performing device 58. When the tempo counter TC is counted down to 0 the operation advances to the next step so that the above-mentioned operations are repeated. Upon detection of the FINISH code, the output registers are cleared to stop the operation of the musical instrument.

What we claim is:

1. An electronic musical instrument comprising:
an automatic performance device for effecting an automatic accompaniment which sounds a plurality of consecutive beats in a music rhythm progression, said beats defining reference times for correct timing of a musical performance;
keyboard means having keys representing respective notes and being capable of being depressed by an operator of the instrument;
tone forming circuit means coupled to said keyboard means for producing musical tone signals corresponding to notes of the keys being depressed;
memory means for storing performance data of a musical piece to be played in the form of note pitch data and duration data of notes constituting a progression of the musical piece;
keyboard indicator means coupled to said memory means and responsive to each application of note pitch data read out of said memory means for visually indicating a key to be depressed on said keyboard means by an operator of the instrument; and
control means coupled to said memory means for reading at least the note pitch data of said performance data out of said memory means and including means for sequentially applying the read out note pitch data corresponding to each note to said keyboard indicator means and for causing said keyboard indicator means to visually indicate to an operator a respective key determined by said note pitch data of each note at an indication time which precedes by a substantial amount of time a correct key depression timing instant at which said indicated key is to be depressed for a correct performance of the musical piece, said instant being in synchronism with the rhythm defined by said consecutive beats defined by said automatic accompaniment, said substantial amount of time being previously determined in relation to the progression of the musical piece.

2. An electronic musical instrument according to claim 1 wherein said memory means stores accompaniment data which represents an accompaniment performance to said progression of said musical piece, said automatic performance device being responsive to accompaniment data read out of said memory means to effect said automatic accompaniment.

3. An electronic musical instrument according to claim 1 wherein said indication time at which said key is indicated by said keyboard indicator means is a time which falls within a duration time of a note immediately preceding the note of said indicated key.

4. An electronic musical instrument according to claim 3 wherein said memory means further stores fingering data representing which finger is to be used to depress the key indicated by said keyboard indicator means; and there is further provided a fingering indicator responsive to the fingering data read out of said memory means to visually provide a fingering indication which indicates a finger to be used by the operator to depress the indicated key.

5. An electronic musical instrument according to claim 4 further comprising means for causing said keyboard indicator means to effect each said key indication for a period of time which is shorter than the duration time of the immediately preceding note which was indicated by said keyboard indicator means.

6. An electronic musical instrument according to claim 4 further comprising means for causing said fingering indicator to effect each said fingering indication for a period of time which is shorter than the duration time of the immediately preceding note which was indicated by said keyboard indicator means.

7. An electronic musical instrument according to claim 1 further comprising an automatic rhythm performing device which is operable in response to the first depression of a key on said keyboard means after said keyboard indicator means indicates a key corresponding to the first note of said musical piece to be played.

8. An electronic musical instrument according to claim 1, wherein said indication time at which said key is indicated by said keyboard indicator means is an instant of time which falls at a start of a duration time of a note immediately preceding the note of said indicated key.

* * * * *